No. 831,181.　　　　　　　　　　　　　　　PATENTED SEPT. 18, 1906.
A. H. OHMAN.
LAWN RAKE.
APPLICATION FILED NOV. 27, 1905.

WITNESSES:
J. Beckbiserger
Anthoney Krapohl

INVENTOR
Adolph H. Ohman
BY
Herman Pistorius
ATTORNEY

THE NORRIS PETERS CO., WASHINGTON, D. C.

UNITED STATES PATENT OFFICE.

ADOLPH H. OHMAN, OF SAGINAW, MICHIGAN.

LAWN-RAKE.

No. 831,181.　　Specification of Letters Patent.　　Patented Sept. 18, 1906.

Application filed November 27, 1905. Serial No. 289,364.

*To all whom it may concern:*

Be it known that I, ADOLPH H. OHMAN, a citizen of the United States, residing at the city of Saginaw, in the county of Saginaw and State of Michigan, have invented certain new and useful Improvements in Lawn-Rakes, of which the following is a specification.

My invention relates to lawn-rakes, and has for its object to provide means whereby when the rake is filled with leaves and refuse it may be lifted from the ground and carried away without spilling. I attain this object by constructing an inclosure over the tines of the rake, so as to form a receptacle having an opening in front provided with a hinged portion capable of closing or opening said opening at the will of the operator by means of an operating and locking device connected to the handle of the rake.

Figure 2:
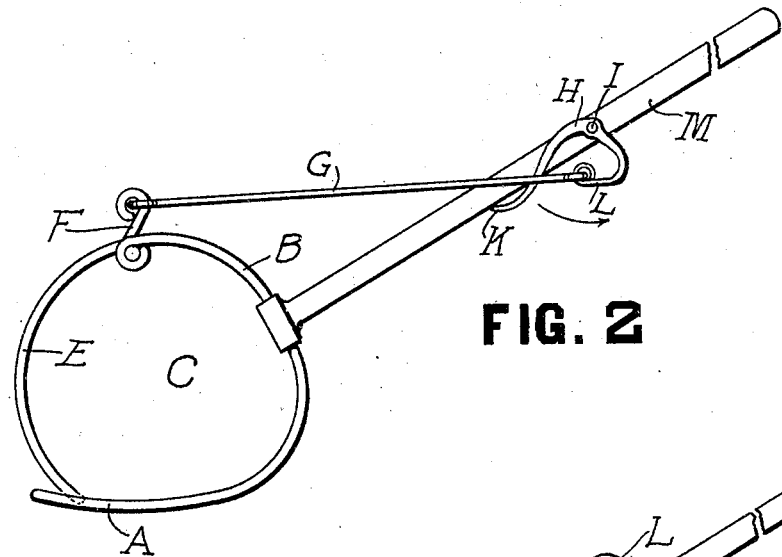
Figure 1:
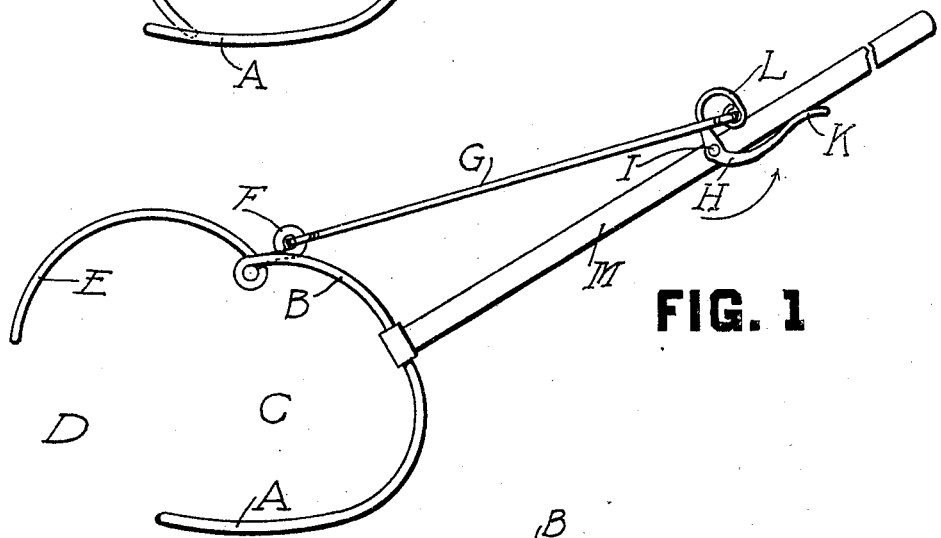
Figure 3:
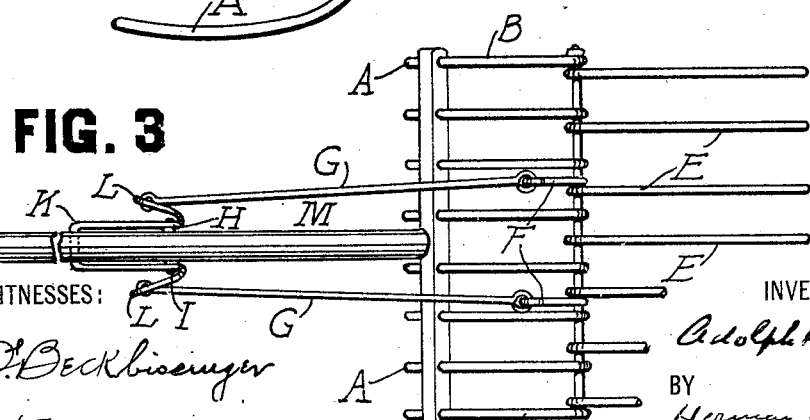

Figure 1 is a side view showing the rake with the receptacle open. Fig. 2 is a side view of same, showing receptacle closed. Fig. 3 is a plan view showing levers for operating the hinged portion.

A represents a series of tines forming the rake, said tines being shaped approximately in the form of a U, so as to form the receptacle C, having the opening D. The upper leg B of the tines terminates with the aperture to form a bearing for a rock-shaft, to which are secured one end of a series of curved bars E and the rock-arms F F. The bars E, with the rock-shaft, form a movable part adapted by its movement to entirely close the opening D of the receptacle C. To the end of rock-arms F F are pivoted the rods G G, connecting with the spring-arms L L of eccentric H, which is secured near to the upper end of the handle M by pin I. K is the handle for operating eccentric H, by means of which the hinged portion E is held open or closed.

The operation of the rake is as follows: By turning the handle K of the spring-eccentric in the direction of the arrow in Fig. 1 the rods G and levers F will be actuated so as to lift the movable portion E, leaving the opening unobstructed. When the eccentric H has been turned to the position shown in Fig. 1, the spring-arms L L have become energized and pull on rods G G, so as to retain the hinged portion E in its open position, the handle K of the eccentric being held from further movement by the handle M. The rake may now be slid along the ground by pushing same before the operator. When the receptacle is filled with leaves or refuse, the eccentric H is turned in a direction opposite to the arrows and the hinged portion E will be released and move down, so as to close the opening D. The rake may now be carried to the refuse heap and there emptied without spilling on the way.

Having described my invention, what I claim is—

1. In a lawn-rake the combination with a series of tines of approximately U shape having bearings in one of their terminals; of a rock-shaft journaled in said bearings having a series of curved bars secured thereto and adapted to form a juncture with the free ends of said tines and thereby form a closed receptacle substantially as shown and described.

2. In a lawn-rake the combination with a series of tines of approximately U shape having bearings in one of their terminals; of a rock-shaft journaled in said bearings; a series of curved bars secured to said rock-shaft and adapted by their movement to form a juncture with the free ends of said tines; rock-arms secured to said rock-shaft; an eccentric operatively connected to said rock-arms by levers for the purpose of controlling the movement of said rock-shaft and curved bars.

3. In a lawn-rake and in combination; a series of fixed approximately U-shaped tines arranged to form a substantially U-shaped receptacle; circular apertures in one of the terminals of said tines; a rock-shaft journaled in said apertures; rock-arms secured to said rock-shaft; and a series of curved bars attached to said rock-shaft adapted to move to form a juncture with the free ends of said tines when actuated by said rock-arms for the purpose set forth.

4. In combination in a lawn-rake, a series of approximately U-shaped tines arranged to form a substantially U-shaped receptacle; bearings in one of the legs of said tines; a rock-shaft journaled in one of the said bearings and a series of curved bars secured to said rock-shaft so as to form a movable portion adapted to successively close and open the opening in said receptacle formed by the series of U-shaped tines substantially as shown and described.

In testimony whereof I have affixed my signature in presence of two witnesses.

ADOLPH H. OHMAN.

Witnesses:
J. F. BECKBISSINGER,
ANTHONEY KRAPOHL.